United States Patent
Mallary et al.

(10) Patent No.: US 7,075,756 B1
(45) Date of Patent: Jul. 11, 2006

(54) SHIELDED POLE WRITER

(75) Inventors: Michael Mallary, Sterling, MA (US);
Mourad Benakli, Sherewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 377 days.

(21) Appl. No.: 10/701,909

(22) Filed: Nov. 5, 2003

Related U.S. Application Data

(60) Provisional application No. 60/424,431, filed on Nov. 7, 2002.

(51) Int. Cl.
*G11B 5/127* (2006.01)

(52) U.S. Cl. .................................... 360/317

(58) Field of Classification Search ................ 360/317, 360/319, 126, 125, 121, 123
See application file for complete search history.

(56) References Cited

U.S. PATENT DOCUMENTS

| | | | |
|---|---|---|---|
| 4,253,127 A | 2/1981 | Kodama et al. | 360/125 |
| 4,317,148 A | 2/1982 | Chi | 360/119 |
| 4,423,450 A | 12/1983 | Hamilton | 360/111 |
| 4,644,432 A | 2/1987 | Heim | 360/123 |
| 4,656,546 A | 4/1987 | Mallary | 360/110 |
| 4,672,493 A | 6/1987 | Schewe | 360/125 |
| 4,748,525 A | 5/1988 | Perlov | 360/110 |
| 5,041,922 A | 8/1991 | Wood et al. | 360/55 |
| 5,075,956 A | 12/1991 | Das | 29/603 |
| 5,111,352 A | 5/1992 | Das et al. | |
| RE33,949 E | 6/1992 | Mallary et al. | 360/110 |
| 5,176,965 A | 1/1993 | Mallary | 428/694 |
| 5,431,969 A | 7/1995 | Mallary | 427/599 |
| 5,680,283 A | 10/1997 | Tanaka et al. | 360/125 |
| 5,801,910 A | 9/1998 | Mallary | 360/126 |
| 5,830,590 A | 11/1998 | Gooch et al. | 428/694 |
| 5,843,565 A | 12/1998 | Davies et al. | 428/212 |
| 6,667,848 B1 * | 12/2003 | Khizroev et al. | 360/125 |
| 6,842,313 B1 * | 1/2005 | Mallary | 360/319 |
| 2002/0071208 A1 * | 6/2002 | Batra et al. | 360/125 |
| 2004/0100737 A1 * | 5/2004 | Nakamoto et al. | 360/319 |
| 2005/0068671 A1 * | 3/2005 | Hsu et al. | 360/125 |

OTHER PUBLICATIONS

Authors: K. Ise; K. Yamakawa; K. Ouchi; H. Muraoka; Y. Sugita; Y. Nakumura Title: High Writing-Sensitivity Single-Pole Head with Cusp-Field Coils IEEE Transaction on Magnetics; vol. 36, No. 5; Sep. 2000; pp. 2520-2523.

* cited by examiner

*Primary Examiner*—Allen Cao
(74) *Attorney, Agent, or Firm*—Foley & Lardner LLP

(57) ABSTRACT

A read/write head for a disk drive having a magnetoresistive (MR) read element and an inductive write element suitable for perpendicular recording of data onto a disk having a media layer in which the data is stored perpendicularly to the planar surface of the disk and a soft underlayer (SUL) underneath the media layer to provide a low reluctance return path for the magnetic recording field. The write element includes a vertically-oriented write pole and a downstream write shield that is magnetically connected to the write pole by a magnetic via. One or more pancake coils are employed to produce a magnetic field that is focused by the tip of the write pole which is relatively smaller than the remainder of the write pole. The design of the write shield, the write pole, the magnetic vias, and the conductive coils is such as to provide an optimal magnetic field gradient and an optimal write field strength.

41 Claims, 10 Drawing Sheets

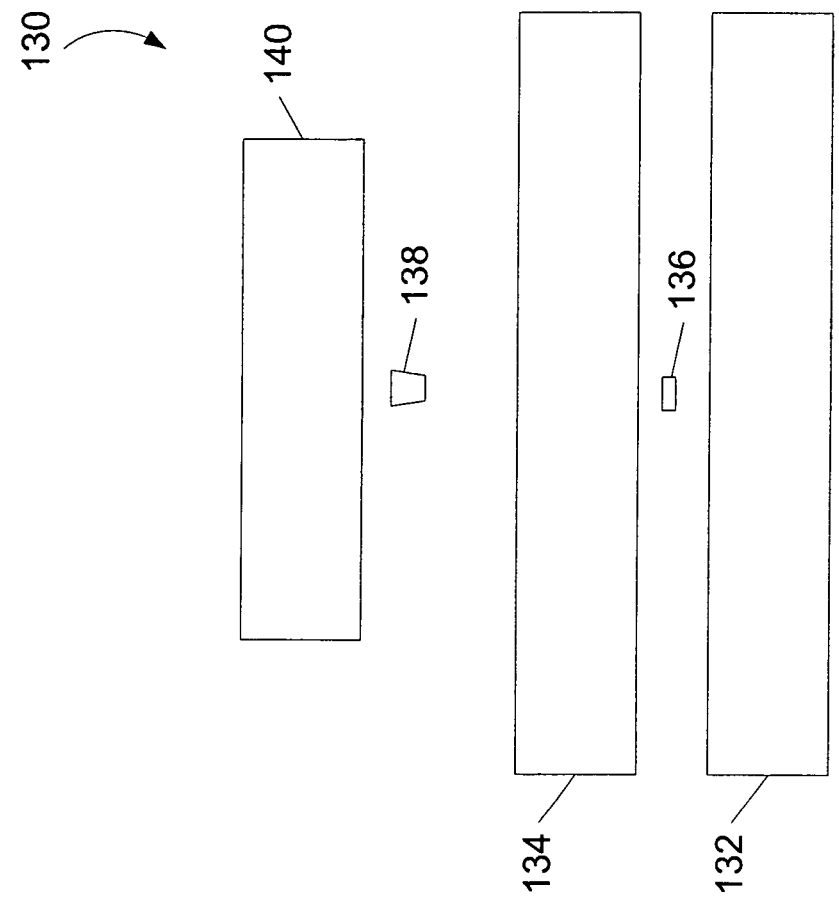
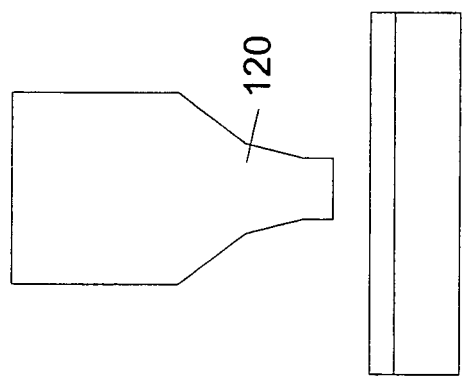
FIG. 7
FIG. 8

SHIELDED POLE WRITER

CROSS-REFERENCE TO RELATED APPLICATIONS

This application claims priority from U.S. Provisional Patent Application No. 60/424,431, filed Nov. 7, 2002, entitled "Biased Shielded Pole Writer", the contents of which are incorporated herein by reference.

FIELD OF THE INVENTION

This application relates to techniques and arrangements for write heads in data storage applications, particularly the shielding of write heads for perpendicular recording.

BACKGROUND OF THE INVENTION

In hard disk drives, data is written to and read from magnetic recording media, herein called disks. Typically, one or more disks having a thin film of magnetic material coated thereon are rotatably mounted on a spindle. A read/write head mounted on an actuator arm is positioned in close proximity to the disk surface to write data to and read data from the disk surface.

During operation of the disk drive, the actuator arm moves the read/write head to the desired radial position on the surface of the rotating disk where the read/write head electromagnetically writes data to the disk and senses magnetic field signal changes to read data from the disk. Usually, the read/write head is integrally mounted in a carrier or support referred to as a slider. The slider generally serves to mechanically support the read/write head and any electrical connections between the read/write head and the disk drive. The slider is aerodynamically shaped, which allows it to fly over and maintain a uniform distance from the surface of the rotating disk.

Typically, the read/write head includes a magnetoresistive read element to read recorded data from the disk and an inductive write element to write the data to the disk. The read element includes a thin layer of a magnetoresistive sensor stripe sandwiched between two magnetic shields that may be electrically connected together but are otherwise isolated. A current is passed through the sensor stripe, and the resistance of the magnetoresistive stripe varies in response to a previously recorded magnetic pattern on the disk. In this way, a corresponding varying voltage is detected across the sensor stripe. The magnetic shields help the sensor stripe to focus on a narrow region of the magnetic medium, hence improving the spatial resolution of the read head.

The write element typically includes a coil of wire through which current is passed to create a magnetic field that can be directed toward an adjacent portion of the disk by a ferromagnetic member known as a write pole. While it is known that the write element can be arranged to either store data longitudinally or perpendicularly on the disk, most, if not all, commercial disk drives to date have utilized longitudinal recording arrangements. Although perpendicular recording techniques have the potential to allow for higher densities of recorded information, longitudinal recording is used in all current products for historical reasons. An early perpendicular recording technique is disclosed in U.S. Pat. No. RE 33,949, the contents of which are incorporated herein by reference.

The '949 patent discloses a perpendicular or vertical write head with a write pole section, downstream shield section, and a pancake coil surrounding the write pole section to generate magnetic flux therein. The shield section is disclosed to have a surface facing toward the media that is many times larger than a similarly-oriented face of the write pole. The media is disclosed to include two layers, an upper layer closer to the head having perpendicular uniaxial anisotropy and a lower layer having low magnetic reluctance (now known as the Soft Under Layer (SUL)). A high write field can then be produced between the write pole and the SUL to record information in the upper layer of the media. The write flux returns through the SUL to the downstream write shield. The return field for this design was predicted to be much lower than the write field because of the larger area of the face of the write shield as compared to the face of the write pole. It was recognized that the return field needed to be sufficiently low so as not to erase the downstream information/data under the write shield.

It has been later discovered that the predictions of a low return field in the region of the face of the write shield were not accurate under high current conditions in the electrical coils. Under these conditions, the large overall area of the electrical coils and the volume of the write shield relative to that of the write pole tended to turn the write shield into a write pole, and the design behaved like an unshielded write pole design. Since the design was unshielded and the write shield had a relatively large surface facing toward the media, the write field gradient was not as high as is desired for high density data recording. The write field gradient is the rate of change of the write field along an axis parallel to the movement of the media.

In addition, the face of the write shield in the '949 patent extended across many adjacent tracks of data. If the field into and out of this face is too large, the data stored on the adjacent tracks can be degraded as well. The phenomenon of unintentionally degrading data stored on adjacent tracks is now called adjacent track erase (ATE). The number of times that a stored bit of information can tolerate these ATE fields without degrading the stored information is a large, but finite, number. It depends on the ATE field strength relative to the threshold field for data degradation, which is known as the nucleation field.

It is desirable to design a shielded write head which does not suffer from the above drawbacks. It is against this background and a desire to improve on the prior art that the present invention has been developed.

SUMMARY OF THE INVENTION

In view of the foregoing, a broad objective of the present invention is to provide a perpendicular recording arrangement with improved write characteristics.

In carrying out these and other objectives, features, and advantages of the present invention, a read/write head for a disk drive that is suitable for perpendicularly recording data in adjacent magnetic recording media is provided, the media including a first layer for recording data and a second layer that is a soft underlayer (SUL) to return magnetic flux to the read/write head, the first layer being characterized in part by a media anisotropy field and a media self-demagnetization field. The head includes a first and second shield, a magnetoresistive sensor located between the first and second shield, a write pole located proximate the second shield, one or more electrically conductive coils associated with the write pole, and a write shield located proximate an opposite side of the write pole from the second shield. A write field is induced between the write pole and the SUL and a return field is induced between the write shield and the SUL. The read/write head is configured so that the return field in the write shield is of opposite polarity than the write field and is of a magnitude that is less than thirty percent of the difference between the media anisotropy field and the media self-demagnetization field.

There may be no magnetic via between the write pole and the second shield. At least a portion of each of the one or more electrically conductive coils associated with the write pole may pass between the write pole and the write shield. The one or more electrically conductive coils associated with the write pole may all be pancake coils. A magnetic via may magnetically connect the write shield to the write pole.

A first magnetic via may magnetically connect the write pole to the second shield and a second magnetic via may magnetically connect the write shield to the write pole. The cross-sectional area of the first magnetic via may be substantially equal to the cross-sectional area of the second magnetic via. The cross-sectional area of the first magnetic via may be substantially smaller than the cross-sectional area of the second magnetic via. The first magnetic via may be designed to restrict the amount of magnetic flux flowing therethrough as compared to the second magnetic via.

The one or more electrically conductive coils associated with the write pole may include a first pancake coil having at least a portion thereof located between the write pole and the second shield and a second pancake coil having at least a portion thereof located between the write pole and the write shield. The first pancake coil may be a bucking coil. The first and second pancake coils may have a different number of turns. The first pancake coil may have less turn than the second pancake coil. The first and second pancake coils may have the same number of turns.

The adjacent magnetic recording media may be caused to move relative to the read/write head in a direction that causes a given portion of media to pass first by the magnetoresistive sensor and then by the write pole and then by the write shield. The distance from the write pole to the soft underlayer may fall within a range from approximately equal to the distance from the write shield to the write pole to approximately twice the distance from the write shield to the write pole. The write shield may be a trailing write shield and the head may further include a pair of lateral side write shields located on opposite sides of the write pole from each other.

Another aspect of the present invention relates to a read/write head for a disk drive, the head being suitable for perpendicularly recording data in adjacent magnetic recording media, the media including a first layer for recording data and a second layer that is a soft underlayer (SUL) to return magnetic flux to the read/write head. The head includes a first and second shield, a magnetoresistive sensor located between the first and second shield, a write pole located proximate the second shield, and one or more electrically conductive coils having at least a portion located between the write pole and the second shield. The head also includes a write shield located proximate an opposite side of the write pole from the second shield, the write shield being magnetically connected to the write pole by a magnetic via, and one or more electrically conductive coils having at least a portion located between the write pole and the write shield.

The one or more electrically conductive coils located between the write pole and the write shield may have the same number as the one or more electrically conductive coils located between the write pole and the second shield. The one or more electrically conductive coils located between the write pole and the write shield may have a different number of turns than the one or more electrically conductive coils located between the write pole and the second shield. The coil located between the write pole and the write shield may have more turns than the coil located between the write pole and the second shield.

The distance from the write pole to the soft underlayer may fall within a range from approximately equal to the distance from the write shield to the write pole to approximately twice the distance from the write shield to the write pole. At least one of the coils may spiral around the write pole. At least one of the coils may spiral around the write pole and at least one of the coils may spiral around the magnetic via connecting the write shield to the write pole. A gap defined between the write pole and the write shield at surfaces of the write pole and write shield that face the media may be of approximately the same distance as the distance from those said surfaces to the SUL.

Another aspect of the present invention relates to a read/write head for a disk drive, the head being suitable for perpendicularly recording data in adjacent magnetic recording media, the media including a first layer for recording data and a second layer that is a soft underlayer (SUL) to return magnetic flux to the read/write head. The head includes a first and second shield, a magnetoresistive sensor located between the first and second shield, a write pole located proximate the second shield, a write shield located proximate an opposite side of the write pole from the second shield, the write shield being magnetically connected to the write pole by a magnetic via, and one or more electrically conductive coils having at least a portion located between the write pole and the write shield. The read/write head is configured so that the product of the write field and the magnetic impedance from the write shield to the SUL divided by the magnetic impedance from the write pole to the second shield is less than thirty percent of the difference between the media anisotropy field and the media self-demagnetization field.

Numerous additional features and advantages of the present invention will become apparent to those skilled in the art upon consideration of the further description that follows.

BRIEF DESCRIPTION OF THE DRAWINGS

FIG. 7 is a longitudinal view of a write pole of the present invention.

FIG. 8 is a schematic ABS view of a read/write head of the present invention.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with disk drives, it should be expressly understood that the present invention may be applicable to other applications where magnetic recording of data is required/desired. In this regard, the following description of a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application(s) or use(s) of the present invention.

Figure 12:
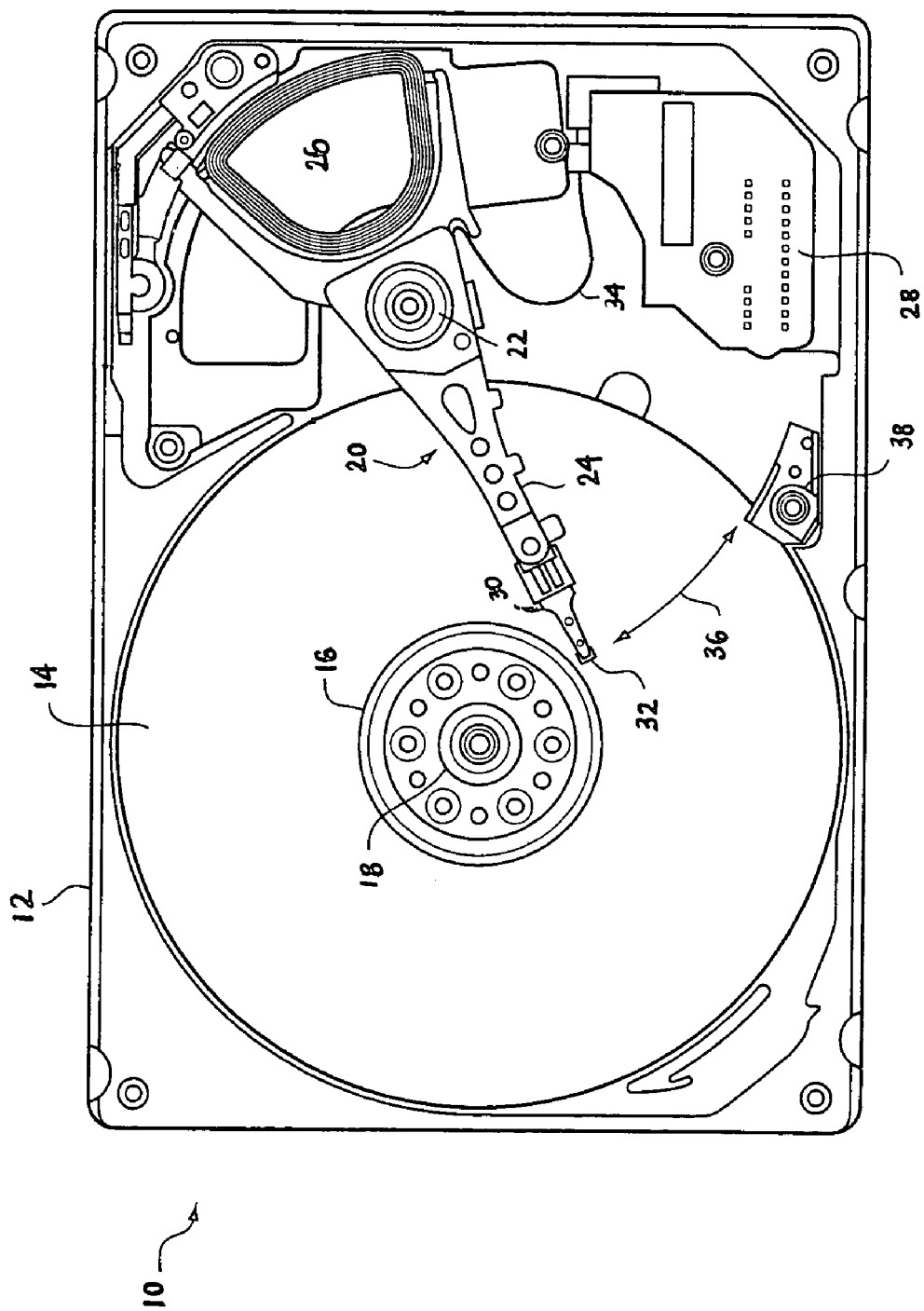
FIG. 12 is a top view of a disk drive that utilizes a head of the present invention.

FIG. 12 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance ($\Delta R/R$) of 2–4%. GMR results from spin-dependent scattering mechanisms between two (or more) magnetic layers. The typical use in recording heads is the spin valve device that uses a pinned magnetic layer and a free layer to detect external fields. The normalized change in resistance is typically 8–12%, but can be as large as 15–20% when used with specular capping layers and spin-filter layers. TuMR is similar to GMR, but is due to spin dependent tunneling currents across an isolation layer. The typical embodiment includes a free layer and a pinned layer separated by a insulating layer of $Al_2O_3$ with the current flowing perpendicular to the film plane, producing normalized change in resistance of 12–25%. The term magnetoresistive is used in this application to refer to all these types of magnetoresistive sensors and any others in which a variation in resistance of the sensor due to the application of an external magnetic field is detected. The write transducer technology of the head of the present invention is discussed in further detail below.

The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or "landing" on its corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

Figure 1:
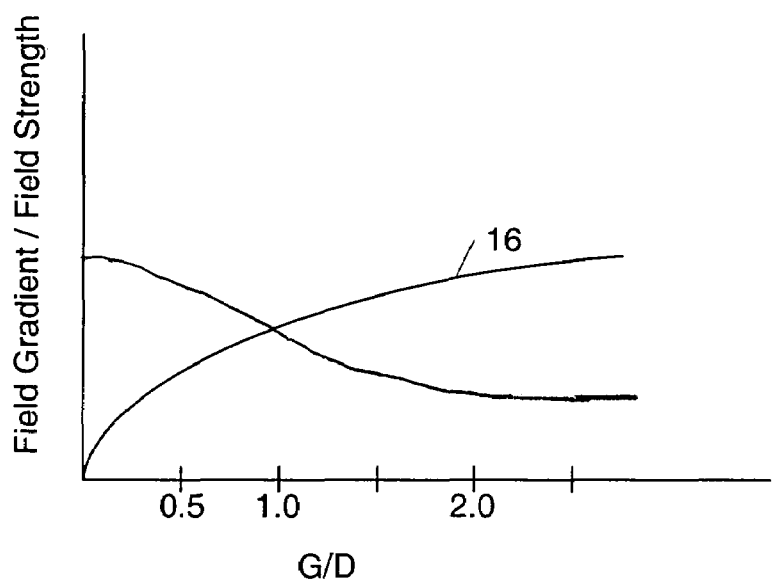
FIG. 1 is a plot of write field strength and write field gradient versus a ratio of the gap to the distance from the write pole to the SUL layer.

It has come to be appreciated that the design of the write portion of a head desirably involves a process of optimizing multiple parameters. As with many multi-variable problems, maximizing one parameter can result in minimizing another. Some of these parameters and their interrelationships will now be discussed. It is recognized by the inventors that it is not desirable, and is sub-optimal, to maximize the perpendicular field strength ($H_\perp$) from the write pole toward the media at the expense of the field gradient ($\Delta H_\perp / \Delta X$), or vice versa. FIG. 1 illustrates curves of these two parameters ($H_\perp$ and $\Delta H_\perp / \Delta X$) as a function of the ratio of the gap length (G) to the distance (D) from the write pole to the SUL. It can be seen that the field strength (curve 16) is maximized by having G/D be greater than 2.0, but this minimizes the field gradient (curve 18).

On the other hand, it is desirable to increase the field gradient 18 since the maximum achievable data density increases along therewith, at a proportion not yet characterized. But maximizing the field gradient 18 by having a very small gap minimizes field strength 16. Unfortunately, the maximum achievable data density increases with field strength also, apparently in proportion to the 4/3 power of field strength. It can be appreciated that there exists an optimal gap length that optimally provides a field strength and field gradient that maximizes the achievable data density.

Figure 2A:
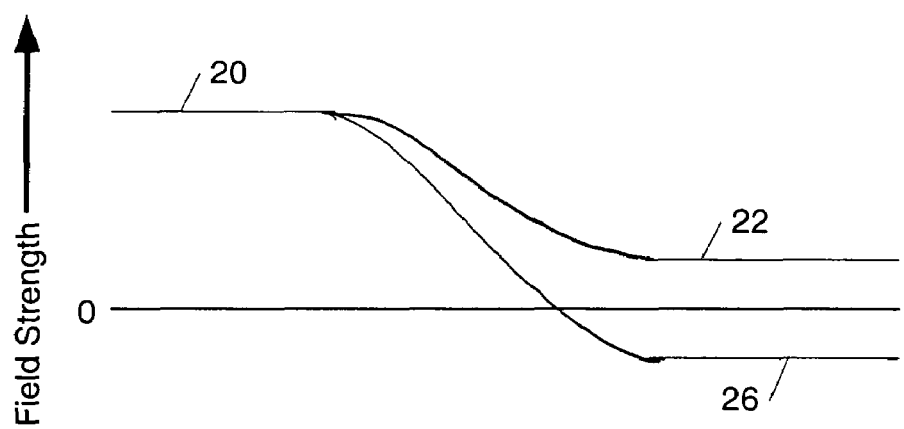
FIG. 2 is a plot of write field strength versus longitudinal position on the write head.
Figure 2B:
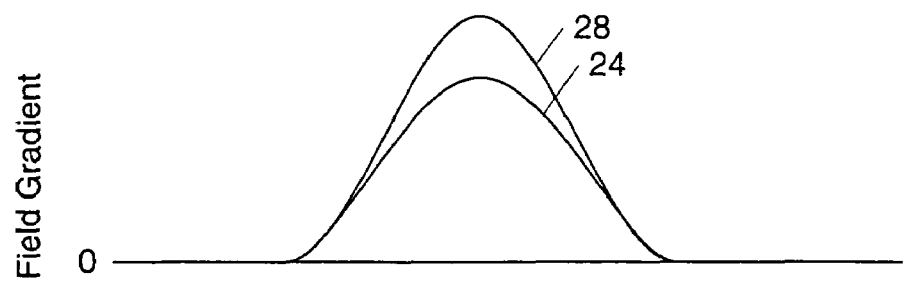

FIGS. 2a and 2b illustrate why having a nearby shield that has a field from the SUL of opposite polarity to the field from the write pole to the SUL will increase the field gradient. Line 20 in FIG. 2a shows a normalized field strength at the write pole, while line 22 shows a field strength at a nearby shield that is approximately 25% of the write pole field. In this case the field to the shield is of the same polarity as the write pole field. Dashed line 24 in FIG. 2b shows an approximation of the field gradient, the rate of change of the field strength versus distance. Line 26 in FIG. 2a shows the situation for a different read/write head with a shield that produces a field strength of approximately 25% of the write pole field, but of an opposite polarity. Dashed line 28 in FIG. 2b shows an approximation of the field gradient in that situation. As can be seen, line 28 is more sloped than line 24, indicating a greater field gradient in this situation.

Another discovery has been the realization that, even though the data is being recorded perpendicularly (or vertically) in the media rather than longitudinally, some amount of longitudinal field helps to switch the grains of magnetic material in the media from one vertical orientation to the opposite vertical orientation (e.g., from up to down). In other words, it has been discovered that rather than merely exposing the upwardly-directed magnetic orientation of a grain to a downward magnetic field to reverse the direction of the magnetic orientation, the grain is more easily reversed if there is also a transverse or horizontal component to the magnetic field (referred to herein as a longitudinal field). The total magnetic field can be seen to be:

$$H_{TOTAL}=((H_X)^2+(H_Y)^2)^{1/2} \quad (1)$$

where $H_X$ is the longitudinal field component and $H_Y$ is the perpendicular field component. A measure of the switchability of the magnetic orientation has been developed. It is referred to as the Stoner-Wolfarth switching field:

$$H_{SW}=((H_X)^{2/3}+(H_Y)^{2/3})^{3/2} \quad (2)$$

Equation 2 summarizes the benefit of the longitudinal field in switching the magnetic orientation of the grain. If $H_K$ is the minimum vertical magnetic field that will switch the magnetic orientation, then $H_{SW}$ is always less than or equal to $H_K$. In fact, if equal vertical and longitudinal fields are applied to the grain, then $H_{SW}$ is equal to one-half of $H_K$.

It has also been estimated what the maximum magnetic field between the SUL and shield can be in order to avoid erasing adjacent track data. The probability that a grain will flip its magnetic orientation due to thermal agitation over a 10 year period is:

$$P=f_0 e^\wedge(-E_B/(kT)) \quad (3)$$

where $f_0$ is the frequency of thermal agitation attempts (30 billion times per second), e is the base of the natural logarithm, $E_B$ is the anisotropy energy barrier density, k is Boltzman's constant, and T is temperature in Kelvin. $E_B$ needs to be greater than 44 kT to prevent approximately 50% of the grains with barrier height $E_B$ from switching in 10 years. Because of the wide distribution in grain size, the average $E_B$ needs to be greater than 60 kT to prevent approximately 90% of the grains from switching in 10 years (e.g., only 10% switch). The anisotropy energy barrier density of a grain in the absence of a perpendicular field that is of opposite direction to magnetic orientation of the grain can also be defined as:

$$E_B=(Ku)(V) \quad (4)$$

where Ku is the magnetic anisotropy energy per unit volume and V is the volume of the grains in the media. And Ku can be expressed as:

$$Ku=H_K M_S/2 \quad (5)$$

so $E_B$ can be expressed as:

$$E_B=(H_K M_S/2)(V) \quad (6)$$

where $M_S$ is the saturation magnetization of the media and the other terms have been previously defined. Since it is difficult to increase $H_K$, $M_S$, or V without having other ill effects, it is difficult to increase $E_B$. For example, increasing $H_K$ would require increasing $H_{SW}$, which would reduce overwrite. Increasing $M_S$ beyond an optimum would decrease the energy barrier. Increasing V would increase the granularity of the media, which would have a negative effect on the signal-to-noise ratio.

For large $M_S$, there is a demagnetization field, and an extra factor is added to equation 6 as follows:

$$E_B=(H_K M_S/2)(V)(1-(H_D/H_S))^2 \quad (7)$$

where $H_D$ is the demagnetization field. If it is a self-demagnetization field, then:

$$H_D=M_S \quad (8)$$

but if there is a shield, then the approximate expression for $H_D$ (neglecting the effect of the shield on the self-demagnetizing field of the media) is:

$$H_D = M_S + H_{SH} \quad (9)$$

where $H_{SH}$ is the field from the SUL to the shield. In this case, the value of $H_{SH}$ and therefore $H_D$ must be controlled to maintain adequate $E_B$.

The media moves by the head at a linear speed of approximately 100 miles per hour, so with the size of the grain in the media and the size of the head, it takes approximately 8 nanoseconds for the grain to pass by the head. It is estimated that there may be 50 million times during 10 years of use that the grain may pass by the head (including writing to adjacent tracks). So, 50 million times for 8 nanoseconds each time results in a total time of approximately 0.4 seconds that the grain is subjected to the demagnetization field from the head. So, rather than having to maintain its magnetization over 10 years, it is as if the grain only has to maintain its magnetization for 0.4 seconds. In this case, it is only necessary for $E_B$ to be greater than 23 kT to prevent approximately 50% of the grains from switching and greater than 31 kT to prevent approximately 90% of the grains from switching.

For the example discussed here, in which the average KuV is 60 kT, the master approximate equation for determining how large $H_{SH}$ can be is:

$$(1-(M_S+H_{SH})/H_K)^2 > 0.5(1-(M_S)/H_K)^2 \quad (10)$$

Expressed another way:

$$0 \leq |H_{SH}| < H_{SH\ MAX} \quad (11)$$

Now Equations 9, 10, and 11 can be solved for $H_{SH}$ MAX to give:

$$|H_{SH\ MAX}| < 0.3\ (H_K - M_S) \quad (12)$$

Figure 3:
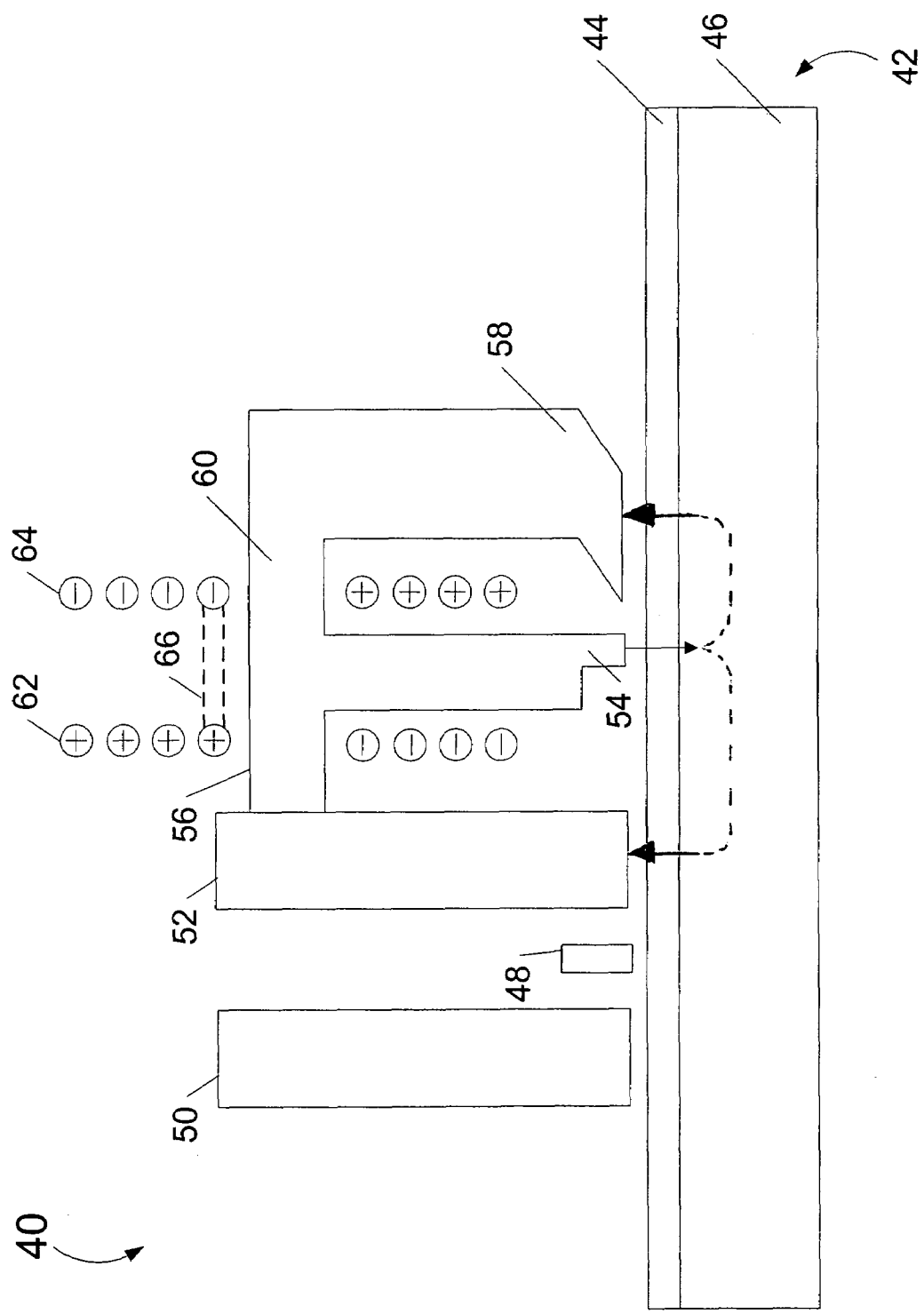
FIG. 3 is a schematic side view of a first embodiment of a read/write head of the present invention.

With this in mind, several specific embodiments that satisfy the above teaching can now be discussed. FIG. 3 shows a read/write head 40 with a balanced coil shielded write pole. As can be seen, the head 40 is shown adjacent to a media layer 42 that includes an upper layer 44 for recording data and a lower SUL layer 46. The head 40 includes a GMR read element 48 sandwiched between a first and second read shield 50 and 52. A write pole 54 is connected to the second read shield 52 by a magnetic via 56. A magnetic shield 58 is connected to the write pole 54 via a second magnetic via 60. The head 40 also includes two sets of pancake write coils 62 and 64. The first pancake write coil 62 surrounds the first magnetic via 56 while the second pancake write coil 64 surrounds the second magnetic via 60. The write coils are coiled in the same direction and connected at the central electrical via 66 so that current flowing in one direction in one coil is flowing in the opposite direction in the other coil. The second pancake write coil 64 is primarily responsible for causing the write field induced by the write pole 54 into the media layer 42. The first pancake write coil 62 is provided as a bucking coil to attempt to cancel the external field caused by the first coil 64. This minimizes unintended flux coupling from the write shield 58 to the read shields 50 and 52. The amp-turns on the two coils 62 and 64 are balanced so that little net field appears under the shields 50, 52, and 58. As will be discussed in further detail below, the write pole 54 is relatively thin as compared to the write pole of a longitudinal head. For example, the write pole may be 0.3 microns in thickness as compared to 2.0 microns in thickness. In addition, the write pole tip 138 has a trapezoidal shape to minimize skew problems, as shown in FIG. 8.

Figure 4:
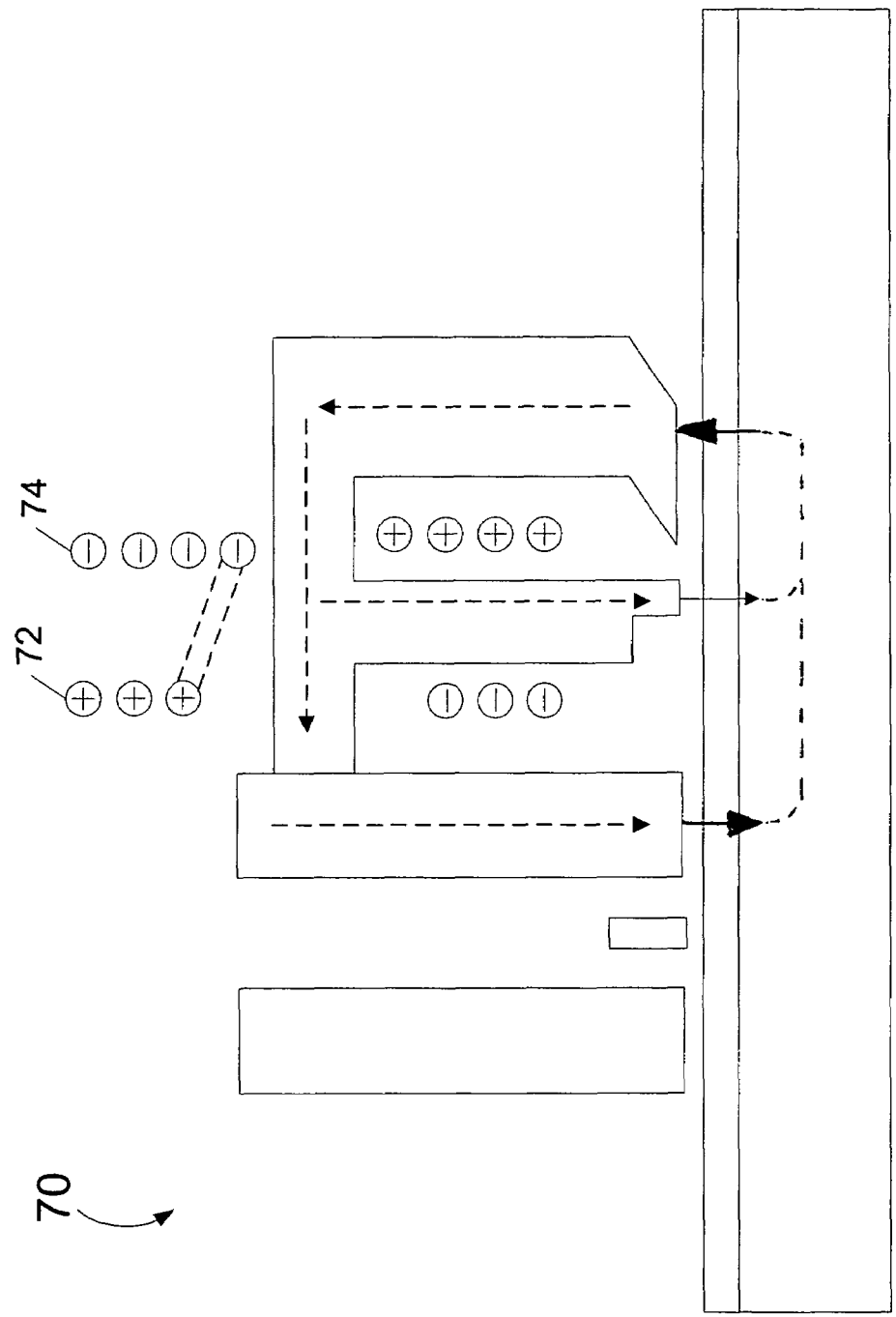
FIG. 4 is a schematic side view of a second embodiment of a read/write head of the present invention.

FIG. 4 shows a read/write head 70 that differs from the read/write head 40. In this case, a pair of pancake write coils 72 and 74 are located in the same relative locations as the pancake write coils 62 and 64 on the head 40. The primary difference is that the write coils are unbalanced by having the amp-turns in the two coils not equal to each other. This is shown in FIG. 4 with a different number of wires in each coil 72 and 74. By unbalancing the two coils 72 and 74, a negative bias field is created under the shield. As discussed previously, this negative bias ($-H_{SH\ MAX}$) in the area of the shield is as high as can be achieved without leading to long-term adjacent track data corruption (see Equation 12).

Figure 5:
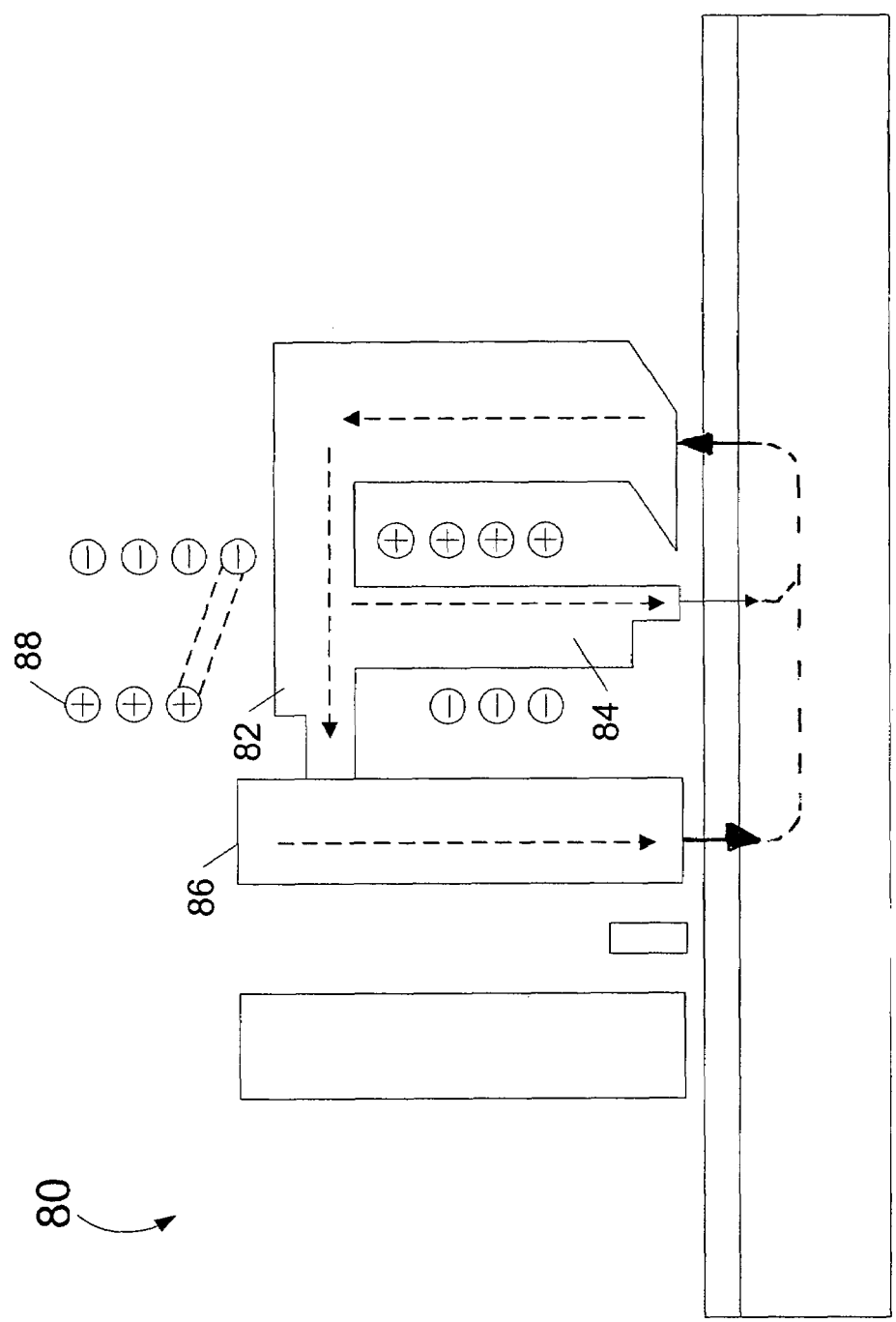
FIG. 5 is a schematic side view of a third embodiment of a read/write head of the present invention.

FIG. 5 shows a head 80 that is very similar to the head 70 of FIG. 4. The head 80 differs primarily in that a magnetic via 82 that connects a write pole 84 to a read shield 86 has a reduced cross section that amounts to a saturable flux restrictor. This allows the current in a first write coil 88 to be overdriven for a fast field rise time without risking too much field under the shields.

Figure 6:
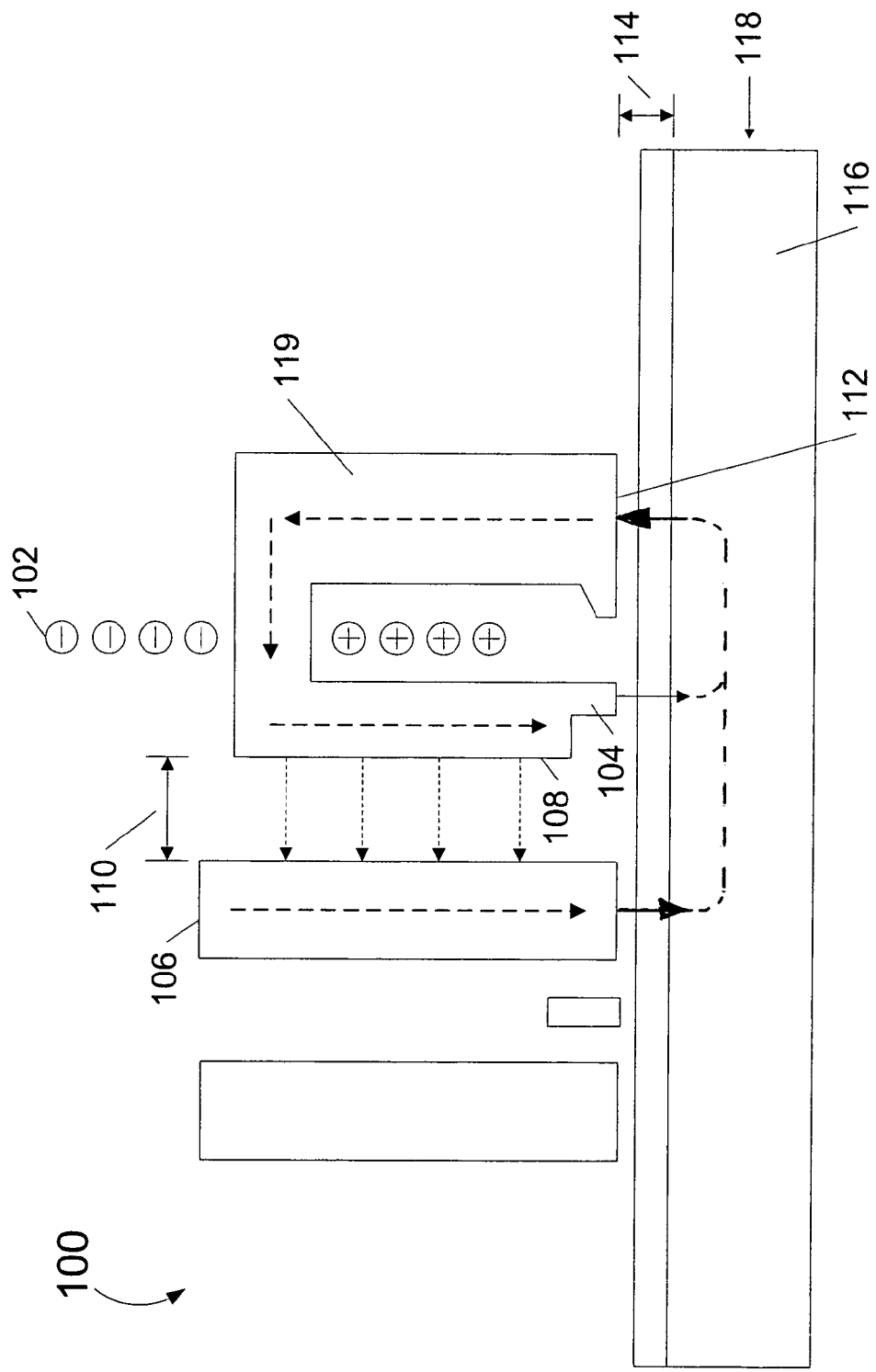
FIG. 6 is a schematic side view of a fourth embodiment of a read/write head of the present invention.

FIG. 6 shows a head 100 having a single write coil 102. In addition, there is no magnetic via from a write pole 104 to a read shield 106. The length 110 of the non-magnetic region between the write pole 104 and the second read shield 106 and the area of the write pole 108 facing this region are carefully sized so that the target field ($-H_{SH\ MAX}$, as defined by Equation 12) under the write shield 119 is approached but not exceeded. The magnetic impedance ($R_{RS}$) of this region is its length 110 divided by the facing write pole surface area 108. Correspondingly, the impedance ($R_{SUL}$) between the write shield 119 and the soft underlayer 116 of the media 118 is the distance 114 to the soft underlayer divided by the facing area 112 of the write shield 119. The field under the write shield $H_{SH}$ is given by the write field $H_W$ of the write pole 104 times the second impedance divided by the first impedance. According to this embodiment of the present invention, the second impedance is lowered by increasing the media facing area 112 of the write shield 119 to the point where $|H_{SH}| < |H_{SH\ MAX}|$ such that adjacent track erasure does not occur even after millions of writes, while preserving the higher write field gradient advantage of having $H_{SH}/H_W < 0$. This criteria is then:

$$|H_W(R_{SUL}/R_{RS})| < |H_{SH\ MAX}| < 0.4\ (H_K - M_S) \quad (13)$$

According to the present invention, adjusting $H_{SH}$ by sizing the second shield to pole area 108 and the write shield to soft underlayer facing area 112 such that Equation 12 is satisfied gives a higher write field gradient 28 while preventing erasure.

FIG. 7 shows a longitudinal view of a write pole tip 120 of the present invention. As can be seen, the tip 120 has a portion with a flare of about 30°. This angle is believed to minimize pole tip induced adjacent track erasure while allowing high write field, as is discussed more completely in U.S. Pat. No. 5,801,910, the contents of which are incorporated herein by reference.

FIG. 8 shows an ABS view of relevant portions of a head 130 of the present invention. The head 130 includes a pair of read shields 132 and 134 between which a GMR read element 136 is located. The gap between the shields 132 and 134 may be approximately 50 nanometers. The head 130 also includes a write pole 138 and a write shield 140. The gap between the write pole 138 and the write shield 140 is approximately equal to the distance 114 in FIG. 6 from the write pole 138 to the SUL layer, which is approximately equal to 50 nanometers. The write pole may be approximately 200 nanometers wide and 300 nanometers thick, with a 10° bevel. This bevel helps to achieve the trapezoidal cross sectional shape that can be seen in FIG. 8, to minimize skew problems. As can be seen, the two read shields 132 and 134 and the write shield 140 are many times wider than either the GMR read element 136 or the write pole 138.

Figure 9:
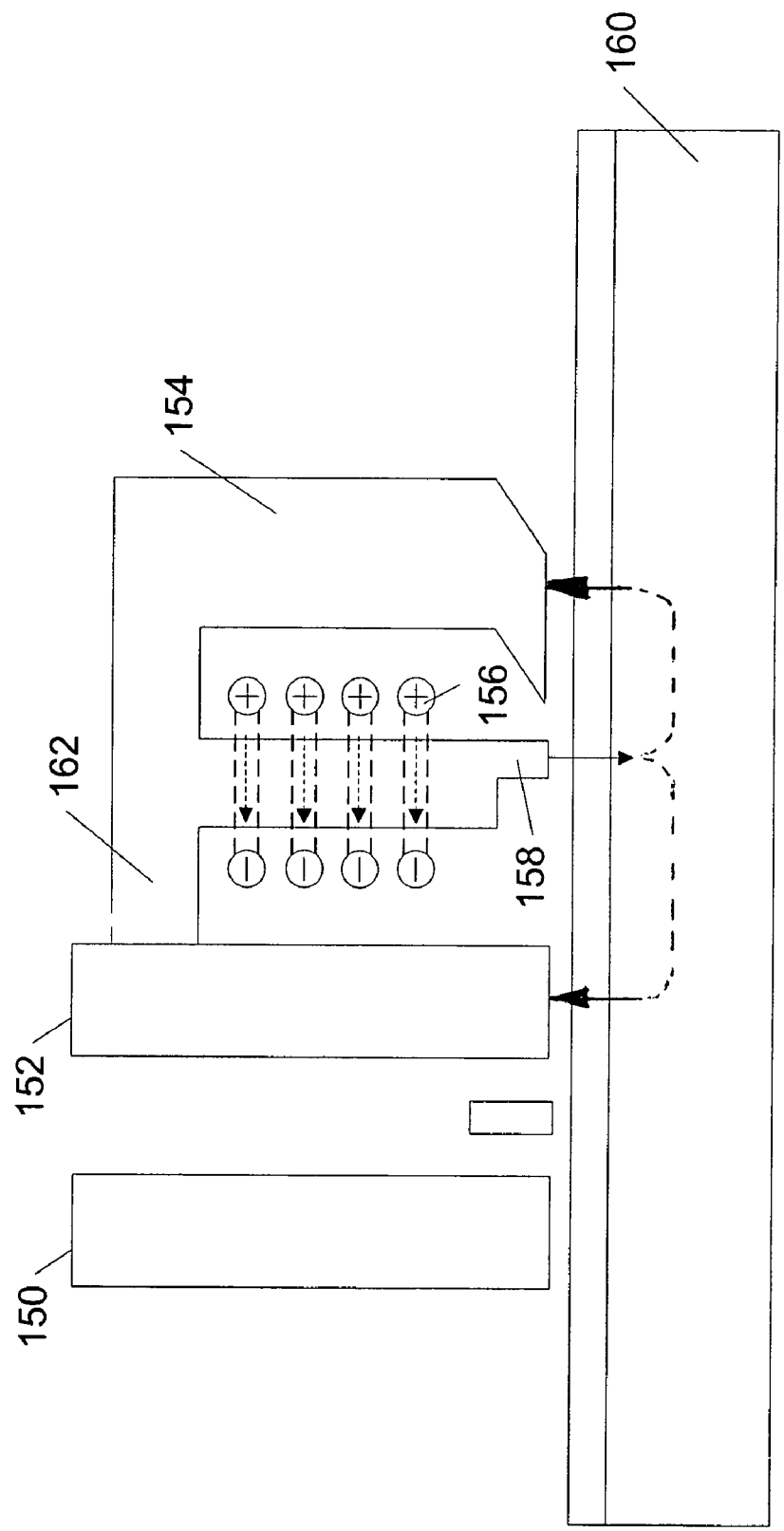
FIG. 9 is a schematic side view of a fifth embodiment of a read/write head of the present invention.

FIG. 9 shows an embodiment of the present invention which reduces the field under the shield to a very low value by not placing any pancake coils between a write shield 154 and read shields 150 and 152. This is accomplished by wrapping a solenoidal type coil 156 around a write pole 158. In this configuration a small $H_{SH}$ results. It is equal to the product of the write field $H_W$ times the total impedance between all of the shields in parallel and the soft underlayer 160 divided by the impedance of the write pole 158 to the soft underlayer 160. The total impedance of all of the shields in parallel is the distance to the soft underlayer 160 divided by the total area of all of the shields. According to the present invention, it is desirable to increase $H_{SH}$ consistent with the limitation of Equation 12. A moderate increase can be achieved by removing a magnetic via 162 between the write pole 158 and the second read shield 152. This reduces the total area presented to the soft underlayer 160 by the coupled shield. Further increase in $H_{SH}$ can be achieved by decreasing the surface area of the write shield 154. Though the solenoidal coil approach is more difficult to achieve with standard processing, it has substantial performance advantages. It is relatively easy to satisfy Equation 12 without an excess write shield size. In addition, it results in a very low coil resistance and inductance. This enables high switching speeds for the current and thus enables high data transfer rates.

Figure 10:
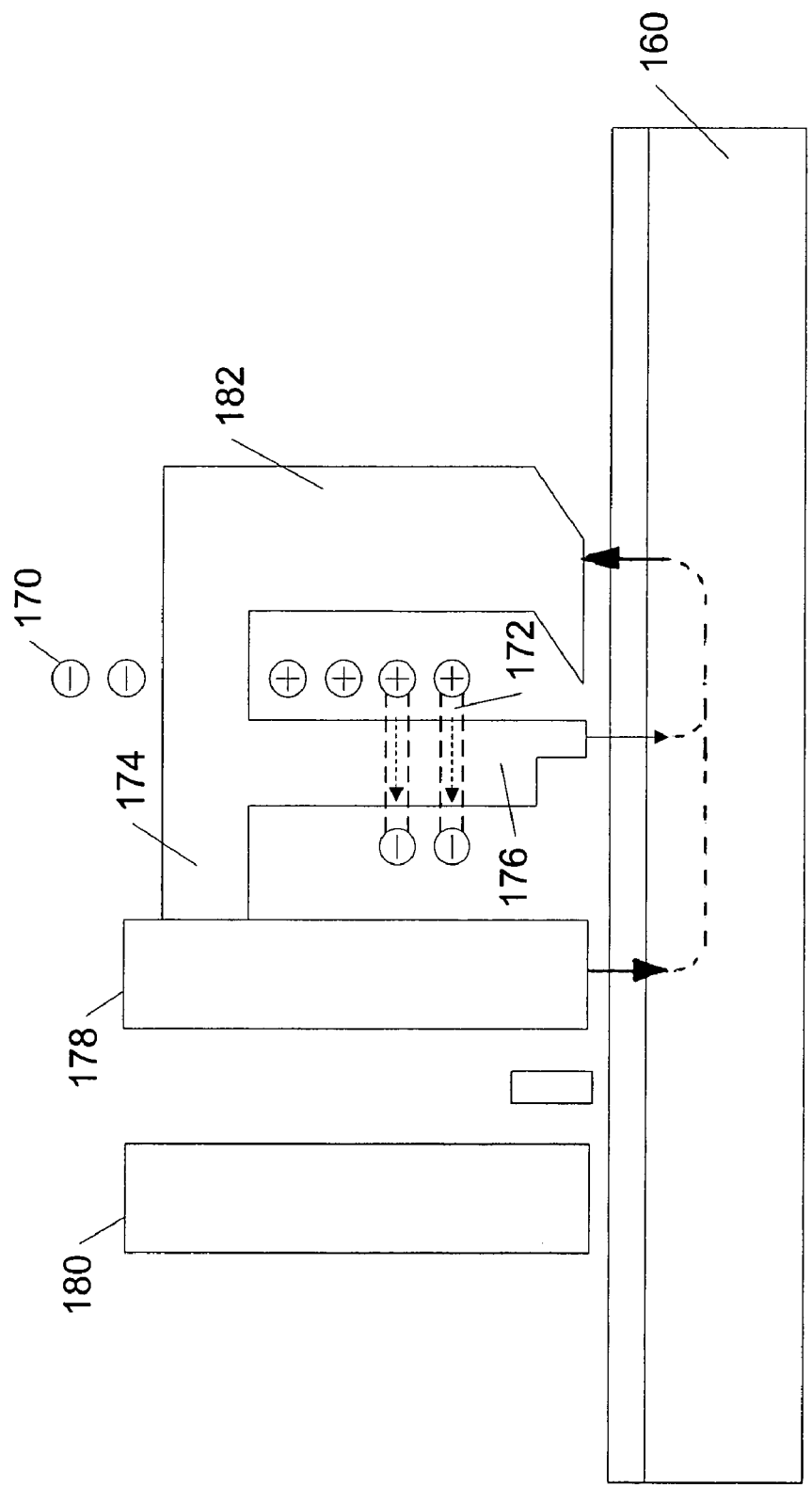
FIG. 10 is a schematic side view of a sixth embodiment of a read/write head of the present invention.

Another embodiment of the present invention is shown in FIG. 10. The desired $H_{SH}$ is achieved with a hybrid between a pancake coil portion 170 and a solenoidal coil portion 172 of the same write coil. In this embodiment, it is advantageous to have a magnetic via 174 between a write pole 176 and a second read shield 178. The desired $H_{SH}$ is achieved by the ratio of the turns in the coil segments 170 and 172 and the soft underlayer facing areas of the two read shields 178 and 180 and a write shield 182. Here the shield field to write field ratio is the ratio of the turns in the pancake coil 170 divided by the sum of the number of turns in the pancake coil 170 and that in the solenoidal coil 172 when the soft underlayer facing area of the read shields 178 and 180 together is much larger than that of the write shield 182. The advantage of this approach is that it is easier to implement in process yet it realizes the low resistance of a pure solenoid because the cumulative resistance of a low turn pancake is close to that of the solenoid. Also, it can achieve the target $H_{SH}$ while maintaining a low magnetic impedance from the write pole 176 to the combined shields 178, 180, and 182 and thus get more write field $H_W$ for a given coil current.

Figure 11:
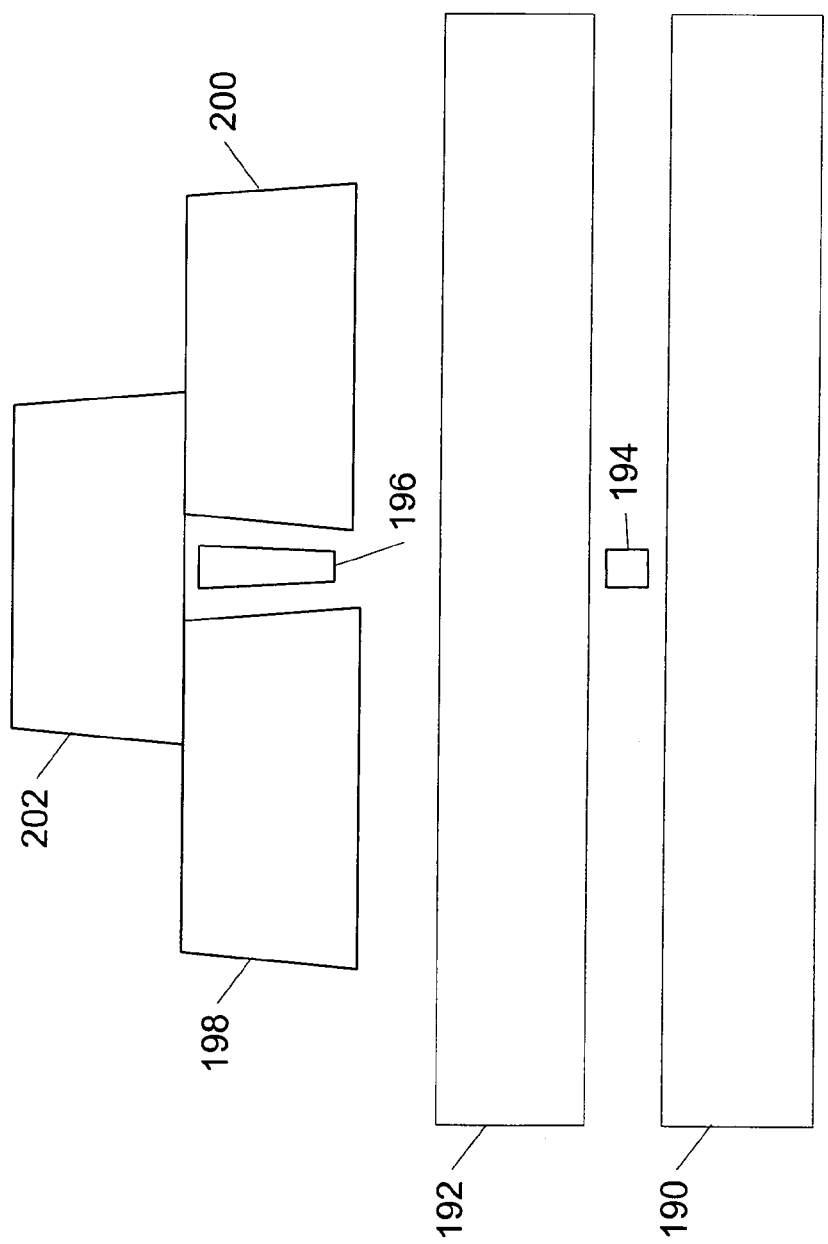
FIG. 11 is a schematic ABS view of a seventh embodiment of a read/write head of the present invention.

Another embodiment is shown in FIG. 11. In this embodiment, a shielded pole writer also includes a pair of read shields 190 and 192 separated by a gap of approximately 20 nm. A GMR read element 194 that is approximately 10 nm thick and 36 nm wide is located in the gap. Proximate the second read shield 192 is a write pole 196 that is partially surrounded by a pair of side write shields 198 and 200 and a trailing write shield 202. The gap between the write pole 196 and each of the side write shields 198 and 200 is approximately 40 nm, while the gap between the write pole 196 and the trailing write shield 202 is approximately 20 nm, which is also the approximate distance (like 114 in FIG. 6) from a tip of the write pole 196 to the SUL. The write pole 196 may be 200 nm thick, 40 nm wide, and have a 3-degree bevel. The presence of the side write shield 198 and 200 in addition to the trailing write shield 202 is advantageous because they reduce the ATE field that emanates directly from the write pole tip 196. Thus, the separation between tracks can be reduced and greater data density results.

As can be appreciated, the present invention includes a perpendicular recording design that provides a reasonable compromise between increasing the field gradient (by providing a downstream shield that is sufficiently close to the write pole tip with a field that is of opposite polarity to the write pole field), while at the same time maintaining a reasonably high write field strength, and making a product that is more easily manufacturable. For example, it has been found that the present design can improve the field gradient in the desired area by 70% as compared to an unshielded design. This field gradient improvement results in a signal to noise ratio that is increased by 4.6 dB. This can result in a significant increase of the areal bit density over an unshielded perpendicular design, perhaps as much as 70%.

Other commonly-owned U.S. patent applications that disclose related subject matter include U.S. patent application Ser. No. 10/710,994, filed on the same day herewith, entitled "Shielded Pole Writer Under Reader" and U.S. patent application Ser. No. 10/697,075, filed Oct. 30, 2003, entitled "Longitudinal Media with Soft Underlayer and Perpendicular Write Head", the contents of each of which are incorporated herein by reference.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A read/write head for a disk drive, the head being suitable for perpendicularly recording data in adjacent magnetic recording media, the media including a first layer for recording data and a second layer that is a soft underlayer (SUL) to return magnetic flux to the read/write head, the first layer being characterized in part by a media anisotropy field and a media self-demagnetization field, the head comprising:

a first and second shield;
a magnetoresistive sensor located between the first and second shield;
a write pole located proximate the second shield;
one or more electrically conductive coils associated with the write pole; and
a write shield located proximate an opposite side of the write pole from the second shield;
wherein a write field is induced between the write pole and the SUL and a return field is induced between the write shield and the SUL, and further wherein the read/write head is configured so that the return field in the write shield is of opposite polarity than the write field and is of a magnitude that is less than thirty percent of the difference between the media anisotropy field and the media self-demagnetization field.

2. A read/write head as defined in claim 1, wherein there is no magnetic via between the write pole and the second shield.

3. A read/write head as defined in claim 2, wherein at least a portion of each of the one or more electrically conductive coils associated with the write pole pass between the write pole and the write shield.

4. A read/write head as defined in claim 2, wherein the one or more electrically conductive coils associated with the write pole are all pancake coils.

5. A read/write head as defined in claim 2, wherein a magnetic via magnetically connects the write shield to the write pole.

6. A read/write head as defined in claim 1, wherein a first magnetic via magnetically connects the write pole to the second shield and a second magnetic via magnetically connects the write shield to the write pole.

7. A read/write head as defined in claim 6, wherein the cross-sectional area of the first magnetic via is substantially equal to the cross-sectional area of the second magnetic via.

8. A read/write head as defined in claim 6, wherein the cross-sectional area of the first magnetic via is substantially smaller than the cross-sectional area of the second magnetic via.

9. A read/write head as defined in claim 6, wherein the first magnetic via is designed to restrict the amount of magnetic flux flowing therethrough as compared to the second magnetic via.

10. A read/write head as defined in claim 1, wherein the one or more electrically conductive coils associated with the write pole include a first pancake coil having at least a portion thereof located between the write pole and the second shield and a second pancake coil having at least a portion thereof located between the write pole and the write shield.

11. A read/write head as defined in claim 10, wherein the first pancake coil is a bucking coil.

12. A read/write head as defined in claim 10, wherein the first and second pancake coils have a different number of turns.

13. A read/write head as defined in claim 12, wherein the first pancake coil has less turns than the second pancake coil.

14. A read/write head as defined in claim 10, wherein the first and second pancake coils have the same number of turns.

15. A read/write head as defined in claim 1, wherein the adjacent magnetic recording media is caused to move relative to the read/write head in a direction that causes a given portion of media to pass first by the magnetoresistive sensor and then by the write pole and then by the write shield.

16. A read/write head as defined in claim 1, wherein the distance from the write pole to the soft underlayer falls within a range from approximately equal to the distance from the write shield to the write pole to approximately twice the distance from the write shield to the write pole.

17. A read/write head as defined in claim 1, wherein the write shield is a trailing write shield and the head further includes a pair of lateral side write shields located on opposite sides of the write pole from each other.

18. A read/write head for a disk drive, the head being suitable for perpendicularly recording data in adjacent magnetic recording media, the media including a first layer for recording data and a second layer that is a soft underlayer (SUL) to return magnetic flux to the read/write head, the head comprising:
  a first and second shield;
  a magnetorestrictive sensor located between the first and second shield;
  a write pole located proximate the second shield;
  one or more electrically conductive coils including at least one coil having at least a portion located between the write pole and the second shield;
  a write shield located proximate an opposite side of the write pole from the second shield, the write shield being magnetically connected to the write pole by a magnetic via; and
  said one or more electrically conductive coils include at least one coil having at least a portion located between the write pole and the write shield.

19. A read/write head as defined in claim 18, wherein the one or more electrically conductive coils located between the write pole and the write shield has the same number as the one or more electrically conductive coils located between the write pole and the second shield.

20. A read/write head as defined in claim 18, wherein the one or more electrically conductive coils located between the write pole and the write shield has a different number of turns than the one or more electrically conductive coils located between the write pole and the second shield.

21. A read/write head as defined in claim 20, wherein the coil located between the write pole and the write shield has more turns than the coil located between the write pole and the second shield.

22. A read/write head as defined in claim 18, wherein the write pole is magnetically connected to the second shield by a magnetic via.

23. A read/write head as defined in claim 22, wherein the cross-sectional area of the magnetic via between the write pole and the second shield is substantially equal to the cross-sectional area of the magnetic via between the write pole and the write shield.

24. A read/write head as defined in claim 22, wherein the cross-sectional area of the magnetic via between the write pole and the second shield is substantially smaller than the cross-sectional area of the magnetic via between the write pole and the write shield.

25. A read/write head as defined in claim 22, wherein the magnetic via between the write pole and the second shield is designed to restrict the amount of magnetic fltix flowing therethrough as compared to the magnetic via between the write pole and the write shield.

26. A read/write head as defined in claim 18, wherein there is no magnetic via between the write pole and the second shield.

27. A read/write head as defined in claim 18, wherein each of the coils is a pancake coil.

28. A read/write head as defined in claim 18, wherein the coil between the write pole and the second shield is a bucking coil.

29. A read/write head as defined in claim 18, wherein the adjacent magnetic recording media is caused to move relative to the read/write head in a direction that causes a given portion of media to pass first by the magnetoresistive sensor and then by the write pole and then by the write shield.

30. A read/write head as defined in claim 18, wherein the distance from the write pole to the soft underlayer falls within a range from approximately equal to the distance from the write shield to the write pole to approximately twice the distance from the write shield to the write pole.

31. A read/write head as defined in claim 18, wherein at least one of the coils spirals around the write pole.

32. A read/write head as defined in claim 18, wherein at least one of the coils spirals around the write pole and at least one of the coils spirals around the magnetic via connecting the write shield to the write pole.

33. A read/write head as defined in claim 18, wherein a gap defined between the write pole and the write shield at surfaces of the write pole and write shield that face the media is of approximately the same distance as the distance from those said surfaces to the SUL.

34. A read/write head as defined in claim 18, wherein the write shield is a trailing write shield and the head further includes a pair of lateral side write shields located on opposite sides of the write pole from each other.

35. A read/write head for a disk drive, the head being suitable for perpendicularly recording data in adjacent magnetic recording media, wherein the adjacent magnetic recording media includes a first layer for recording data and a second layer that is a soft underlayer (SUL) to return magnetic flux to the read/write head, the head comprising:
a first and second shield;
a magnetoresistive sensor located between the first and second shield;
a write pole located proximate the second shield;
a write shield located proximate an opposite side of the write pole from the second shield, the write shield being magnetically connected to the write pole by a magnetic via; and
one or more electrically conductive coils having at least a portion located between the write pole and the write shield;
wherein the read/write head is configured so that the product of the write field and the magnetic impedance from the write shield to the SUL divided by the magnetic impedance from the write pole to the second shield is less than thirty percent of the difference between the media anisotropy field and the media self-demagnetization field.

36. A read/write head as defined in claim 35, wherein each of the coils is a pancake coil.

37. A read/write head as defined in claim 35, wherein the adjacent magnetic recording media is caused to move relative to the read/write head in a direction that causes a given portion of media to pass first by the magnetoresistive sensor ann men by the write pole and then by the write shield.

38. A read/write head as defined in claim 35, wherein the distance from the write pole to the soft underlayer falls within a range from approximately equal to the distance from the write shield to the write pole to approximately twice the distance from the write shield to the write pole.

39. A read/write head as defined in claim 35, wherein there is no magnetic via from the write pole to the second shield.

40. A read/write head as defined in claim 35, wherein there is a magnetic via from the write pole to the second shield.

41. A read/write head as defined in claim 35, wherein the write shield is a trailing write shield and the head further includes a pair of lateral side write shields located on opposite sides of the write pole from each other.

* * * * *

UNITED STATES PATENT AND TRADEMARK OFFICE
CERTIFICATE OF CORRECTION

PATENT NO. : 7,075,756 B1  Page 1 of 1
APPLICATION NO. : 10/701909
DATED : July 11, 2006
INVENTOR(S) : Michael Mallary and Mourad Benakli It is certified that error appears in the above-identified patent and that said Letters Patent is hereby corrected as shown below:

Line 27 of column 9    "<" should read --$\leq$--.

Line 28 of column 9    "$H_{SH}MAX$" should read --$H_{SH\ MAX}$--.

Line 40 of column 14   "fltix" should read --flux--.

Line 11 of column 16   "ann men" should read --and then--.

Signed and Sealed this

Tenth Day of April, 2007

JON W. DUDAS
*Director of the United States Patent and Trademark Office*